(12) United States Patent
Hansen et al.

(10) Patent No.: US 7,324,944 B2
(45) Date of Patent: Jan. 29, 2008

(54) SYSTEMS AND METHODS FOR DYNAMICALLY ANALYZING TEMPORALITY IN SPEECH

(75) Inventors: Lynne Hansen, Laie, HI (US); Joshua Rowe, Troutdale, OR (US)

(73) Assignee: Brigham Young University, Technology Transfer Office, Provo, UT (US)

( * ) Notice: Subject to any disclaimer, the term of this patent is extended or adjusted under 35 U.S.C. 154(b) by 902 days.

(21) Appl. No.: 10/734,084

(22) Filed: Dec. 11, 2003

(65) Prior Publication Data

US 2004/0193409 A1    Sep. 30, 2004

Related U.S. Application Data

(60) Provisional application No. 60/433,291, filed on Dec. 12, 2002.

(51) Int. Cl.
*G10L 21/00*  (2006.01)

(52) U.S. Cl. ............... 704/270; 704/251; 704/231; 704/211; 434/185; 434/178

(58) Field of Classification Search ........ 704/270–278, 704/231, 251, 211; 434/178, 156, 157, 185
See application file for complete search history.

(56) References Cited

U.S. PATENT DOCUMENTS

| | | | | |
|---|---|---|---|---|
| 4,377,158 | A * | 3/1983 | Friedman et al. | 128/897 |
| 5,634,086 | A * | 5/1997 | Rtischev et al. | 704/270 |
| 5,717,828 | A * | 2/1998 | Rothenberg | 704/251 |
| 5,749,071 | A * | 5/1998 | Silverman | 704/260 |
| 5,870,709 | A * | 2/1999 | Bernstein | 704/275 |
| 6,076,056 | A * | 6/2000 | Huang et al. | 704/254 |
| 6,077,085 | A * | 6/2000 | Parry et al. | 434/322 |
| 6,134,529 | A * | 10/2000 | Rothenberg | 704/270 |
| 6,157,913 | A | 12/2000 | Bernstein | |
| 6,224,383 | B1 * | 5/2001 | Shannon | 434/156 |
| 6,305,942 | B1 * | 10/2001 | Block et al. | 434/156 |
| 2002/0143546 | A1 | 10/2002 | Laying et al. | |
| 2004/0049391 | A1 * | 3/2004 | Polanyi et al. | 704/271 |

OTHER PUBLICATIONS

Cucchiarini et al. Quantitative assessment of second language learners' fluency by means of automatic speech recognition technology. Journal of Acoustical Society of America, Feb. 2000, vol. 107, No. 2, p. 989-999.

Towell. Relative degrees of fluency. International Review of Applied Linguistics. Jun. 4, 2002, vol. 40, No. 2, p. 117-150.

Archambault et al. Fluency and Use of Segmental Dialect Feature in the Acquisition of a Second Language (French) by English Speakers Spoken Language, 1996, ICSLP 96. Proceedings., International Conference, on p. 622-625 vol. 2, especially pp. 622-623.

* cited by examiner

*Primary Examiner*—Vijay Chawan
(74) *Attorney, Agent, or Firm*—Kirton & McConkie; Michael F. Krieger

(57) ABSTRACT

Systems and methods for dynamically analyzing temporality in an individual's speech in order to selectively categorize the speech fluency of the individual and/or to selectively provide speech training based on the results of the dynamic analysis. Temporal variables in one or more speech samples are dynamically quantified. The temporal variables in combination with a dynamic process, which is derived from analyses of temporality in the speech of native speakers and language learners, are used to provide a fluency score that identifies a proficiency of the individual. In some implementations, temporal variables are measured instantaneously.

15 Claims, 3 Drawing Sheets

SYSTEMS AND METHODS FOR DYNAMICALLY ANALYZING TEMPORALITY IN SPEECH

RELATED APPLICATIONS

This application claims priority to U.S. patent application Ser. No. 60/433,291 filed Dec. 12, 2002, entitled SPEECH FLUENCY ANALYSIS AND TRAINING SYSTEM, which is incorporated herein by reference.

BACKGROUND OF THE INVENTION

1. Field of the Invention

The present invention relates to providing dynamic speech fluency analysis in any language. In particular, the present invention relates to systems and methods for dynamically analyzing temporality in an individual's speech in order to selectively categorize the speech fluency of the individual. Further embodiments embrace providing speech training based on the results of the dynamic analysis.

2. Background and Related Art

Educational environments are currently available for individuals to learn a second language. For example, schools and universities provide foreign language classes wherein instructors teach vocabulary, grammar and pronunciation. Other techniques for teaching second languages include audio and/or video programs that teach foreign languages.

In some instances, the foreign language is English. English as a second language ("ESL") programs are available to teach individuals English, where English is not their native tongue. While ESL programs have proven particularly helpful to students who desire to learn English in order to participate in English school systems, the diversity of English proficiency among ESL students presents a difficulty in determining a proper class placement for the ESL students.

For example, the ESL students are personally evaluated by faculty members of an English school system to determine the proficiency of each ESL student in speaking and understanding the English language. The personal evaluation is used as the basis for placement of the ESL students into appropriate class levels. While this technique is currently available for the placement of ESL students into appropriate class levels, the time demands of personally evaluating each ESL student can prove to be challenging on the part of the faculty members making the proficiency determination, especially in areas where large populations of ESL students live. And when the required amount of time is not taken to understand and evaluate the proficiency of every ESL student, an ESL student may be placed in an inappropriate class level for his/her proficiency in speaking and understanding the English language. The results of inappropriate class placement of ESL students include causing the educational environment to be excessively challenging or unduly easy for the ESL student, both of which impede optimal educational growth of the ESL student.

While the representative example above relates to English as a second language, challenges are experienced in all languages relating to the ability to measure fluency. And, while techniques currently exist that are used to measure or otherwise determine fluency, challenges still exist. Accordingly, it would be an improvement in the art to augment or even replace current techniques with other techniques for evaluating a student's oral language proficiency.

SUMMARY OF THE INVENTION

The present invention relates to providing speech fluency analysis. In particular, the present invention relates to systems and methods for dynamically analyzing temporality in an individual's speech in order to selectively categorize the speech fluency of the individual. Further, speech training may be provided based on the results of the dynamic analysis.

Implementation of the present invention takes place in association with a dynamic analysis process for oral fluency. At least some implementations are adapted to be a measurement of learner speech. Moreover, implementations of the present invention may be used in the training and/or testing of second language learners.

At least some implementations take place in association with a computer device that is used to quantify selected temporal variables in a speech sample. The temporal variables in combination with a dynamic process, which is derived from analyses of them in the speech of native speakers and language learners, are used to provide a fluency score that identifies the oral proficiency of the individual. In some implementations, the temporal variables are measured instantaneously.

While the methods and processes of the present invention have proven to be particularly useful in the measurement of oral competence, those skilled in the art can appreciate that the methods and processes can be used in a variety of different application, including oral language acquisition and attrition, cross-linguistic comparisons of temporality in speech, and the like.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to providing speech fluency analysis. In particular, the present invention relates to systems and methods for dynamically analyzing temporality in an individual's speech in order to selectively categorize the speech fluency of the individual and to selectively provide speech training based on the results of the dynamic analysis.

Embodiments of the present invention take place in association with a dynamic analysis process for oral fluency. Temporal variables of one or more speech samples in combination with a dynamic process, which is derived from analyses of temporal phenomena in the speech of native speakers and language learners, are used to provide a fluency score that identifies the proficiency of an individual. In some embodiments, the temporal phenomena are measured instantaneously.

The following disclosure of the present invention is grouped into two subheadings, namely "Exemplary Operating Environment" and "Dynamically Analyzing Temporality in Speech." The utilization of the subheadings is for convenience of the reader only and is not to be construed as limiting in any sense.

Exemplary Operating Environment

Figure 1:
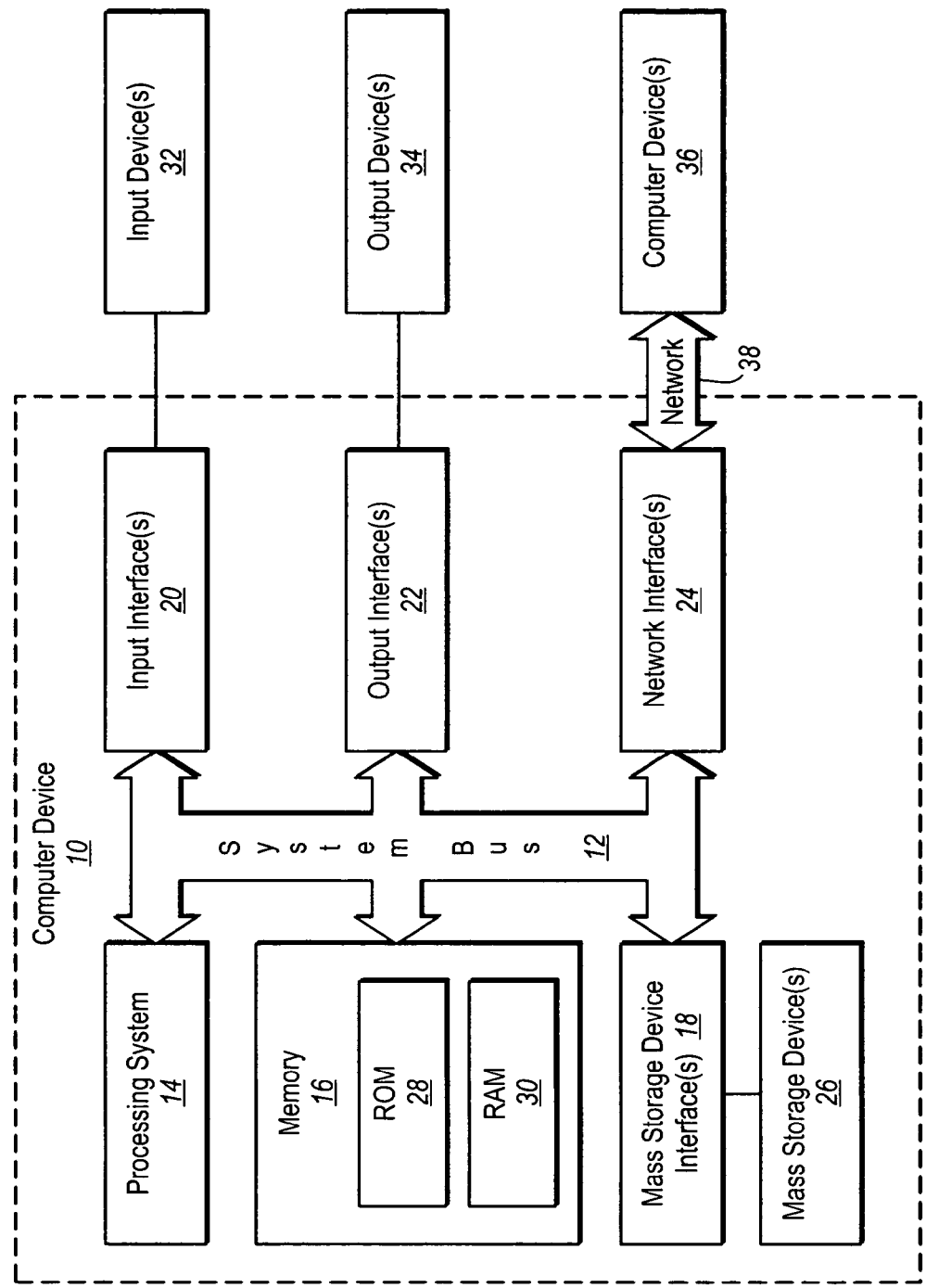
FIG. 1 illustrates a representative system that provides a suitable operating environment for use of the present invention.

As at least some embodiment of the present invention take place in association with a computer device that is used to dynamically analyze speech fluency, such as by quantifying selected temporal variables in one or more speech samples, FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data. One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
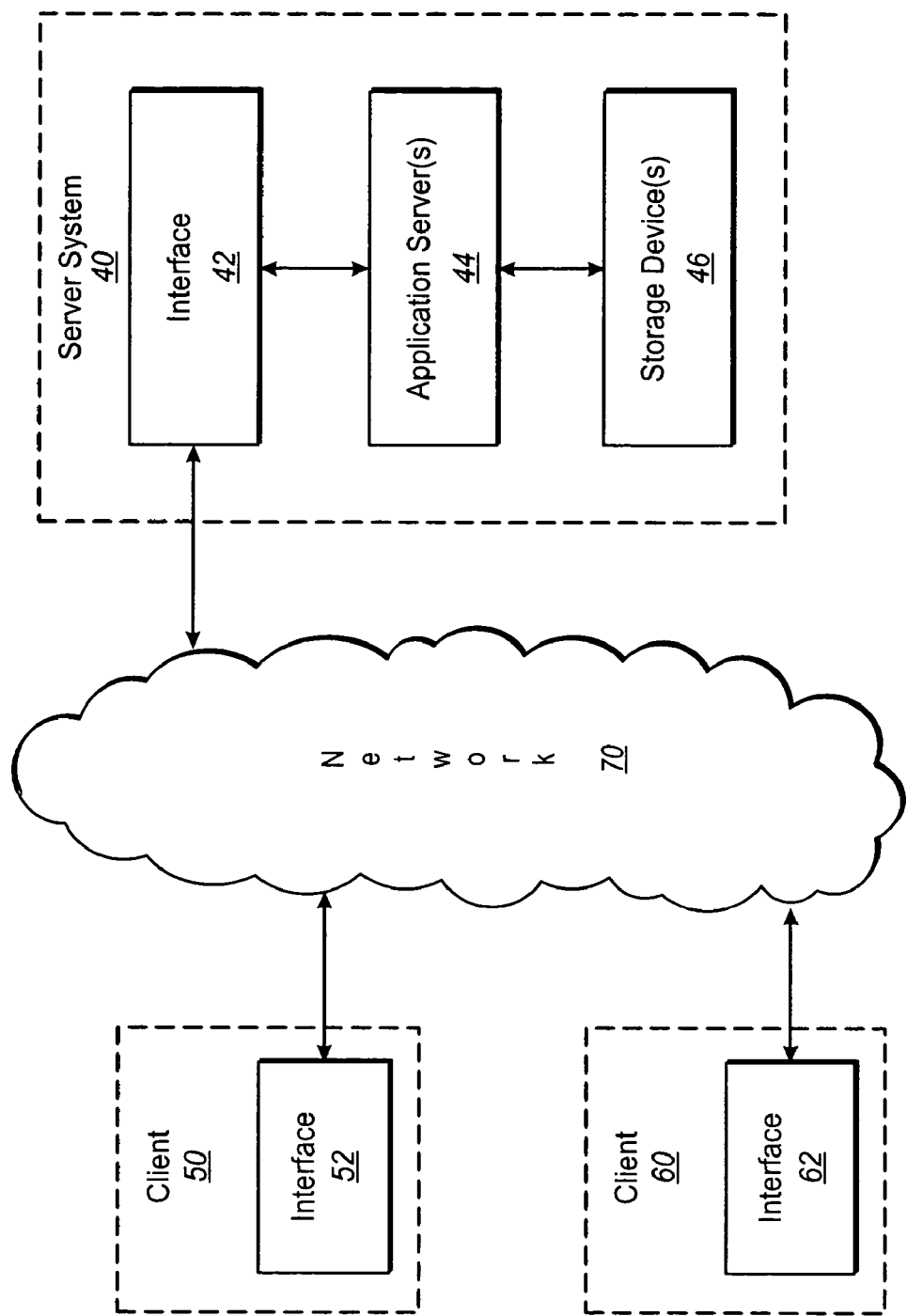
FIG. 2 illustrates a representative system configuration in accordance with an embodiment of the present invention.

While those skilled in the art will appreciate that the invention may be practiced in a variety of computing environments, with many types of computer system configurations, including networked environments, FIG. 2 represents an embodiment of the present invention in a networked environment that includes a variety of clients connected to a server system via a network. While FIG. 2 illustrates an embodiment that includes multiple clients connected to the network, alternative embodiments include one client connected to a network, one server connected to a network, or a multitude of clients throughout the world connected to a network, where the network is a wide area network, such as the Internet. Moreover, some embodiments of the present invention embrace non-networked environments, such as where a dynamic analysis is performed in accordance with the present invention is a single computer device. At least some embodiment of the present invention further embrace at least a portion of a dynamic analysis for the presence of temporal variables in order to categorize speech fluency in an environment that does not require a computer device.

In FIG. 2, a representative networked configuration is provided for which a dynamic analysis is performed. Server system 40 represents a system configuration that includes one or more servers. Server system 40 includes a network interface 42, one or more servers 44, and a storage device 46. A plurality of clients, illustrated as clients 50 and 60, communicate with server system 40 via network 70, which may include a wireless network, a local area network, and/or a wide area network. Network interfaces 52 and 62 are communication mechanisms that respectfully allow clients 50 and 60 to communicate with server system 40 via network 70. For example, network interfaces 52 and 62 may be a web browser or other network interface. A browser allows for a uniform resource locator ("URL") or an electronic link to be used to access a web page sponsored by a server 44. Therefore, clients 50 and 60 may independently obtain speech samples and access or exchange information with server system 40.

As provided above, server system 40 includes network interface 42, servers 44, and storage device 46. Network interface 42 is a communication mechanism that allows server system 40 to communicate with one or more clients via network 70. Servers 44 include one or more servers for processing and/or preserving information. Storage device 46 includes one or more storage devices for preserving information, such as a particular record of data. Storage device 46 may be internal or external to servers 44.

In the illustrated embodiment of FIG. 2, the networked system is used to perform a dynamic speech fluency analysis. In particular, the representative system is used to dynamically analyze temporality in an individual's speech, as will be further discussed below. Those skilled in the art will appreciate that the networked system of FIG. 2 is a representative system in accordance with the present invention. Accordingly, embodiments of the present invention embrace other computer system configurations for performing methods disclosed herein.

Dynamically Analyzing Temporality in Speech

As provided above, embodiments of the present invention relate to providing speech fluency analysis. In particular, embodiments of the present invention relates to systems and methods for dynamically analyzing temporality in an individual's speech in order to selectively categorize the speech fluency of the individual and to selectively provide speech training based on the results of the dynamic analysis.

Fluency relates to a spoken command of a language. In particular fluency, relates to an ability to communicate any number of ideas, whether abstract, concrete, and/or commands to another in the absence of any linguistic problems that would hinder or distort the communication. Some have used the term to indicate an ability to speak without undue pausing, or to speak in coherent sentences.

Fluency is performance based. Temporal variables in speech reflect or indicate a speaker's ability to produce fluent speech. Such temporal variables include (i) a total number of silent pauses, (ii) a total amount of silent time, (iii) an average length of silent pauses, (iv) a total number of runs of speech, (v) a total amount of time of speech, (vi) an average length of run of speech, and (vii) other similar variables. In accordance with at least some embodiments of the present invention, such temporal variables are dynamically identified to determine benchmarks for which less fluent speakers may be compared to identify respective levels of fluency.

Temporal variables, such as unfilled pauses, are quantifiable variables that are directly correlated with fluency. Furthermore, the temporal variables can change over time, along with fluency. Temporality in speech reflects or otherwise indicates oral proficiency, and significantly correlates with ratings of oral proficiency by skilled human raters.

Figure 3:
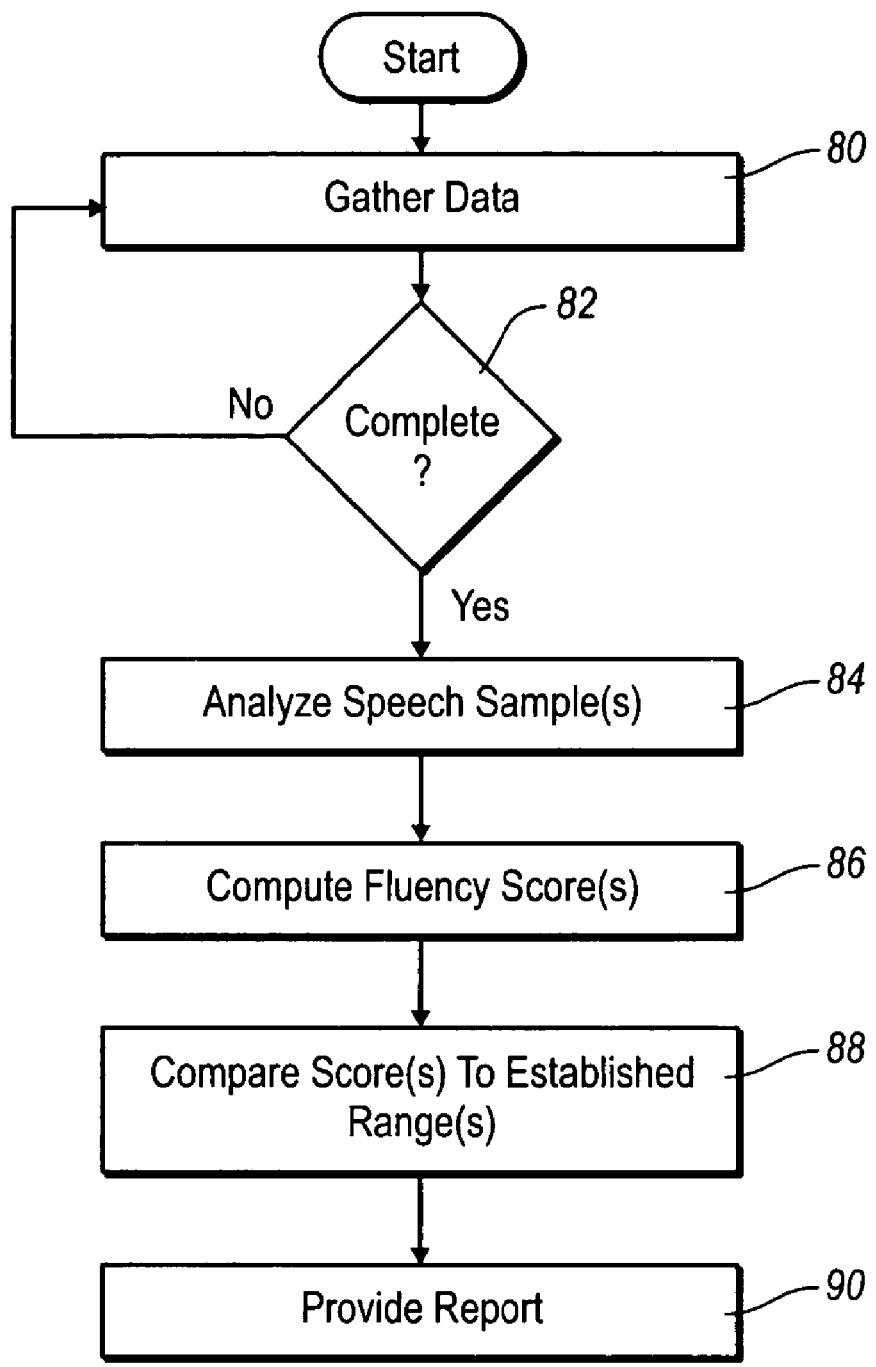
FIG. 3 is a flow chart that represents representative processing relating to an embodiment for providing speech fluency analysis and training.

With reference now to FIG. 3, a representative embodiment for providing a dynamic speech fluency analysis is provided. In FIG. 3, execution begins at step 80, where data is gathered. The gathered data may include general information and/or speech information. General information identifies the individual and includes, for example, the individuals name, background, native language, other languages spoken, and other information characteristic of the individual. Speech information includes, for example, a speech sample that is obtained from the individual, such as by being recorded by a computer device or other mechanism. In some embodiments the speech sample is obtained in an electronic format, such as in a .wav or other electronic format.

At decision block 82 a determination is made as to whether or not all of the information that is to be used in performing the dynamic analysis has been obtained. If it is determined at decision block 82 that all of the information has not been obtained, execution returns back to step 80 for obtaining information. Alternatively, once all of the information has been received execution proceeds to step 84.

At step 84 the one or more speech samples obtained at step 80 are dynamically analyzed. The analysis identifies or otherwise seeks out specific temporal variables in the speech samples. In at least some embodiments of the present invention, the analysis is performed instantaneously.

As mentioned above, the temporal variables include a total number of silent pauses (SP#), a total amount of time of silence (TTSP), and average length of silent pause (AveSP), a total number of runs (Run#), a total amount of time of speech (TTT), an average length of run of speech (AveRT), and other similar temporal variables. The total number of silent pauses is the number of times the individual or test taker stops speaking for any reason. In at least some embodiments, the pauses last for a minimum of 0.5 seconds in order to be classified a silent pause. The total amount of time of silence is the total amount of time that is registered as silence over a period of time that is used by the individual or test taker to respond. The average length of silent pause is the total number of pauses divided by the total amount of time of silence, the average length of each pause. The total number of runs is the total number of times that the individual or test taker begins speaking anew, or initiates runs of speech between pauses. The total amount of time of speech is the total amount of time that the individual or test taker is speaking. The average length of run of speech is the total amount of time of speech divided by the total number of runs, the average length of each run of speech.

Once the speech samples have been analyzed at step 84, execution proceeds to step 86 for a determination of the fluency scores for the individual. The following provides a representative embodiment for determining the fluency score of the individual.

Using the temporal variables indicated above, the following equations may be used to show statistically distinguishing results between different levels of fluency. While the numbers used in the following equations are specific in nature, they have been and are still being considered as part of a final equation that can determine a level of fluency of an individual. While each variable within each equation is drawn from a speech sample, the constant to which all of the variables are added and the numbers to which each variable is multiplied have been and are being examined at 10% of the value of the number, both above and below the number present in the equation. In terms of the scaled equations, the numbers used for the acceptable ranges that define which level of fluency have been and are being looked at in addition to 10% of the number above and below the number presented in the equation.

A label given to each equation is used as its variable name when its results are used as a variable in a later equation. The scaled equation uses the outcome of the equation referred to in its name, and applies it to the defined scale in order to find the value of the variable.

The scale used to determine the levels of fluency places a value of 60 at the highest level of fluency and a value of 20 at the lowest level of fluency. The following are representative equations that may be used to implement an embodiment of the present invention:

$$45.773+(-0.510*TTSP)+(0.759*AveRT) \qquad \text{Equation\#1}$$

ScaledEquation#1: if Equation#1=0-25 then ScaledEquation#3=20
if Equation#1=25-38 then ScaledEquation#3=30
if Equation#1=38-47 then ScaledEquation#3=40
if Equation#1=47-56 then ScaledEquation#3=50
if Equation#1=56-highest then ScaledEquation#3=60

$$57.287+(-0.591*Run\#)+(-0.609*TTSP) \qquad \text{Equation\#2}$$

ScaledEquation#2: if Equation#2=0-22 then Scaled Equation#3=20
if Equation#2=22-37 then Scaled Equation#3=30
if Equation#2=37-48 then Scaled Equation#3=40
if Equation#2=48-54 then Scaled Equation#3=50
if Equation#2=54-highest then Scaled Equation#3=60

$$(AveRT*AveRT*AveRT)/2 \qquad \text{Equation\#3}$$

ScaledEquation#3: if Equation#3=0-1 then ScaledEquation#3=20
if Equation#3=1-10 then ScaledEquation#3=30
if Equation#3=10-150 then ScaledEquation#3=40
if Equation#3=150-2000 then ScaledEquation#3=50
if Equation#3=2000-highest then ScaledEquation#3=60

$$(TTSP*TTSP) \qquad \text{Equation\#4}$$

ScaledEquation#4: if Equation#4=0-21 then ScaledEquation#4=20
if Equation#4=21-70 then ScaledEquation#4=30
if Equation#4=70-300 then ScaledEquation#4=40
if Equation#4=300-2000 then ScaledEquation#4=50
if Equation#4=2000-highest then ScaledEquation#4=60

$$16.786+(-0.208*TrSP)+(0.558*ScaledEquation\#3)+ \\ (0.203*ScaledEquation\#4) \qquad \text{Equation\#5}$$

ScaledEquation#5: if Equation#5=0-25 then ScaledEquation#3=20
if Equation#5=25-36 then ScaledEquation#3=30
if Eqnation#5=36-47 then ScaledEquation#3=40
if Eqnation#5=47-55 then ScaledEquation#3=50
if Eqnation#5=55-highest then ScaledEquation#3=60

$$14.374+(-0.182*TTSP)+(0.558*ScaledEquation\#3)+ \\ (0.203*ScaledEquation\#4) \qquad \text{Equation\#6}$$

$$17.650+(-0.238*TTSP)+(0.710*ScaledEquation\#5) \qquad \text{Equation\#7}$$

$$(-0.236*ScaledEqaution\#1)+(1.222*Equation\#6) \qquad \text{Equation\#8}$$

ScaledEquation#8: if Equation#9=0-25 then Scaled.Equation#3=20
if Equation#9=25-37 then ScaledEquation#3=30
if Equation#9=37-46 then SealedBquation#3=40
if Equation#9=46-55 then ScaledEquation#3=50
if Equation#9=55-highest then ScaledEquation#3=60

$$(0.900*Equation\#8)+4.688 \qquad \text{Equation\#9}$$

$$3.259+(0.971*ScaledEquation\#8) \qquad \text{Equation\#10}$$

$$47.322+(11.422*SP\#)+(-2.979*TTSP)+(- \\ 7.215*Run\#)+(11.635*AveSP)+(-0.962*TTT)+ \\ (3.837*AveRT) \qquad \text{Equation\#11}$$

$$42.464+(-0.432*TTSP)+(1.145*AveRT) \qquad \text{Equation\#12}$$

$$63.086+(-3.582*AveSP)+(-1.402*Run\#) \qquad \text{Equation\#13}$$

$$27.525+(-0.898*SP\#)+(0.575*TTT) \qquad \text{Equation 14}$$

$$30.005+(-0.372*TTSP)+(-0.0121*AveSP)+(-0.478*Run\#)+(3.319*TTT)+(-0.817*AveRT)+(0.0009194*Equation\#3)+(0.651*ScaledEquation\#3) \quad \text{Equation\#15}$$

$$-20.649+(1.595*SP\#)+(0.0573*TTSP)+(0.668*AveSP)+(0.188*TTT)+(-1.346*Run\#)+(-0.539*AveRT)+(-0.0996*ScaledEquation\#1+(-0.000737*Equation\#3)+(0.0888*ScaledEquation\#3)+(0.0001802*Equation\#4)+(0.308*ScaledEquation\#4)+(0.998*Equation\#10) \quad \text{Equation\#16}$$

$$-6.416+(0.09514*TTT)+(-0.631*AveRT)+(0.208*ScaledEquation\#4)+(0.937*Equation\#10) \quad \text{Equation\#17}$$

$$-151.149+(-0.0143*Equation\#3)+(4.342*ScaledEquation\#3)+(-3.032*TTSP)+(20.326*AveSP)+(7.607*Run\#)+(-1.449*TTT)+(2.984*AveRT) \quad \text{Equation\#18}$$

The following equation may be used to obtain the level of fluency of the test taker in accordance with the present representative embodiment:

$$\text{Fluency Equation}=-151.149+(-0.0143*Equation\#3)+(4.342*ScaledEquation\#3)+(-3.032*TTSP)+(20.326*AveSP)+(7.607*Run\#)+(-1.449*TTT)+(2.984*AveRT)$$

In the present embodiment, the initial variables are obtained by taking the mean of each individual variable from each sample within the test. The initial Equation#3 and ScaledEquation#3 are obtained by applying the equation to each individual sample and then taking the mean of all of the samples from the test to be used in the Fluency Equation. Each test includes a number of elicit samples based on different scenarios from which the test takers provide a response.

Once the fluency scores are obtained at step 86, the scores are compared to established ranges at step 88. As provided above, in at least some embodiments, the fluency scores are normalized and compared against standard ranges for fluency comparisons. Once the comparison is made at step 88, a report is provided at step 90 that indicates a fluency of the individual, which may be used for class placement, training, and the like.

Thus, as discussed herein, embodiments of the present invention embrace providing speech fluency analysis. In particular, embodiments of the present invention relate to systems and methods for dynamically analyzing temporality in an individual's speech in order to selectively categorize the speech fluency of the individual. Further embodiments provide speech training based on the results of the dynamic analysis.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for determining speech fluency, the method comprising:
   obtaining one or more speech samples from an individual;
   identifying variables present in the speech samples;
   obtaining an average length of speech run by the individual;
   obtaining an average length of silent pause by the individual;
   measuring a total amount of silent time by the individual;
   measuring a total amount of speech time by the individual;
   measuring a total number of speech runs by the individual;
   dynamically analyzing and selectively weighting the variables to determine a speech fluency score;
   comparing the speech fluency score with established fluency ranges; and
   indicating a speech fluency of the individual based on the dynamic analysis, weighting, and comparison.

2. A method as recited in claim 1, further comprising measuring a total number of silent pauses by the individual.

3. A method as recited in claim 1, wherein obtaining one or more speech samples comprises recording the one or more speech samples in an electronic format.

4. A method as recited in claim 3, wherein the electronic format is a .wav format.

5. A method as recited in claim 1, wherein dynamically analyzing and selectively weighting the variables comprises using a computer device to perform at least a portion of the dynamic analysis and weighting.

6. A method as recited in claim 5, wherein dynamically analyzing and selectively weighting the variables includes automatically measuring the variables in the speech samples.

7. A method as recited in claim 6, wherein the variables are measured instantaneously.

8. A method as recited in claim 1, wherein dynamically analyzing and selectively weighting the variables includes weighting the variables based on relevance.

9. A computer program product for implementing within a computer system a method for determining speech fluency, the computer program product comprising:
   a computer readable medium for providing computer program code means utilized to implement the method, wherein the computer program code means is comprised of executable code for implementing:
   receiving one or more speech samples of an individual;
   identifying variables present in the speech samples;
   obtaining an average length of speech run by the individual;
   obtaining an average length of silent pause by the individual;
   measuring a total amount of silent time by the individual;
   measuring a total amount of speech time by the individual;
   measuring a total number of speech runs by the individual;
   dynamically analyzing and selectively weighting the variables to determine a speech fluency score;
   comparing the speech fluency score with established fluency ranges; and
   indicating the speech fluency of the individual based on the dynamic analysis, weighting and comparison.

10. A computer program product as recited in claim 9, wherein the computer program code means is further comprised of executable code for implementing measuring a total number of silent pauses by the individual.

11. A computer program product as recited in claim 9, wherein receiving one or more speech samples comprises recording the one or more speech samples in an electronic format.

12. A computer program product as recited in claim 11, wherein the electronic format is a .wav format.

13. A computer program product as recited in claim 9, wherein dynamically analyzing and selectively weighting the variables includes electronically measuring the variables in the speech samples.

14. A computer program product as recited in claim 13, wherein the temporal variables are measured instantaneously.

15. A computer program product as recited in claim 9, wherein dynamically analyzing and selectively weighting the variables includes selectively weighting the variables based on relevance.

* * * * *